Patented Dec. 24, 1940

2,226,117

UNITED STATES PATENT OFFICE 2,226,117

COMPOSITION OF MATTER

Melvin De Groote, University City, and Bernhard Keiser and Charles M. Blair, Jr., Webster Groves, Mo., assignors to Petrolite Corporation, Ltd., Wilmington, Del., a corporation of Delaware No Drawing. Original application May 9, 1938, Serial No. 206,905, now Patent No. 2,176,703, dated October 17, 1939. Divided and this application July 14, 1939, Serial No. 284,525

7 Claims. (Cl. 260—404)

This invention relates to a new material or composition of matter that is particularly adapted for use in the treatment of emulsions of mineral oil and water, such as petroleum emulsions, for the purpose of separating the oil from the water, our present application being a division of our application Serial No. 206,905, filed May 9, 1938, which has matured as U. S. Patent No. 2,176,703, dated October 17, 1939. In addition to being particularly adapted for use as a demulsifier, in the resolution of crude oil emulsions, said new material or composition of matter may have uses in other arts that we have not investigated.

The new material or composition of matter which constitutes the subject-matter of our present application consists of a complex ester derived by reaction between (a) a certain kind of complex amine derived from blown oils and tertiary hydroxyamines; and (b) polybasic carboxy acids. Said new compound or composition of matter is particularly adapted for use as a demulsifier for crude oil emulsions, either alone or in admixture with conventional demulsifying agents of a compatible type.

In using said material to break petroleum emulsions of the water-in-oil type, the emulsion is subjected to the action of a demulsifying agent consisting of said material, thereby causing the emulsion to break down and separate into its component parts of oil and water or brine when the emulsion is permitted to remain in a quiescent state, after treatment, or is subjected to other equivalent separatory procedure.

As previously indicated, our new material or composition of matter is derived by reaction between a polybasic carboxy acid or its functional equivalent, such as an anhydride, and a complex amine of the kind derived by reaction between a tertiary hydroxy amine and a blown oil. Polybasic carboxy acids include phthalic acid, maleic acid, malic acid, succinic acid, adipic acid, etc. Insofar that the complex amine derived from a tertiary hydroxy amine and a blown oil is not a well known article of commerce, we will hereinafter describe the same in detail. In this connection, attention is called to our application Serial No. 206,900, filed May 9, 1938, which has matured as U. S. Patent No. 2,167,346, dated July 25, 1939 which is concerned with breaking petroleum emulsions, by means of such complex amines, and also to our co-pending applications Serial No. 180,992 and Serial No. 180,993, both filed December 21, 1937.

Attention is directed to the fact that in describing the manufacture of the new composition of matter which constitutes our present invention, an esterification process may appear at three different stages:

In the first place, if one had a blown fatty acid instead of a blown oil, such acidic material could be esterified in a conventional manner with any alcohol, i. e., ethyl alcohol, ethylene glycol, or glycerol, by means of intimate mixture in presence of dried HCl, at a temperature above 100° C.

Secondly, the neutral blown oil—neutral in the sense that it is in ester form—is treated with a product such as triethanolamine. In this instance, rearrangement takes place so that an alcohol radical or radicals of the triethanolamine become combined with the oxy-acyl radicals of the acidic materials present in the blown oil. Thus, this particular rearrangement is also an esterification.

Finally, when the complex amine is prepared, it is then subjected to esterification with a polybasic carboxy acid, such as phthalic acid. For the sake of convenience only, the final step of esterification involving phthalic acid or the like will be referred to at all times as polybasic carboxy esterification. It is understood that this designation is purely an arbitrary procedure, in order to simplify the discussion herein included which is concerned with the manufacture of these new compositions of matter.

The subject-matter immediately following, which is concerned with the preparation of the complex amine, is taken substantially verbatim from our application Serial No. 206,900, filed May 9, 1938, which has matured as U. S. Patent No. 2,167,346, dated July 25, 1939.

The complex amines which are subsequently subjected to polybasic carboxy esterification are derived from blown oils. It has long been known that various animal, vegetable, and marine oils can be blown or oxidized so as to yield materials which differ in chemical and physical properties and characteristics from the parent materials from which they were derived. The oxidation process is generally conducted by means of moist or dry air, ozone, ozonized air, or a mixture of the same. It may be conducted at atmospheric pressure, or may be conducted under increased pressures of several atmospheres or more. Oxidation may be conducted at relatively low temperatures, for instance, 100° C. or 130° C., or may be conducted at a much higher temperature. Oxidation may be conducted in absence of catalysts, or in presence of catalysts. Such catalysts may consist of metallic salts, such as cobalt or manganese oleate, or may consist of organic material, such as alpha pinene or the like. Oxidation may be conducted in a relatively short time, such as 20 hours, or may require 200 hours or more.

The blown or oxidized oils are generally selected from unsaturated oils of the non-drying type, or the semi-drying type, including the marine oils, such as marine mammal oils, etc. They are rarely selected from the active drying oils, such as linseed oil and perilla oil. Although glycerides of saturated acids, such as stearin or palmitin may be oxidized, such blown materials are rarely employed in the various arts. Oxidation of the active drying oils, such as linseed oil or perilla oil is generally apt to yield a solid or almost solid product, and as a result, the complex amines are rarely produced from such materials alone, but may be produced from a mixture of oils containing some proportion of such active drying oils. In actual practice, blown oils of the kind employed in various industries, such as the demulsification of petroleum emulsions, are derived from castor oil, rapeseed oil, cottonseed oil, peanut oil, corn oil, olive oil, and various marine oils, such as sardine, herring, sperm, menhaden, and pilchard oil.

When an unsaturated fatty acid or oil, for instance, olive oil, is blown or oxidized with air, hydroxyl groups are formed at the ethylene linkage. This is particularly true if oxidation is carried out with moist air. It is believed that oxygen is first absorbed so as to saturate the ethylene linkage, and that further reaction takes place with water to produce two hydroxyl groups. Whether or not this is the correct explanation, it is known that hydroxyl groups are formed. For instance, "Chemistry of the Oil Industry," by Southcombe, 1926, page 181, in speaking of blown (oxidized) oils, states as follows:

"Hydroxyl groups are unquestionably formed, as the considerable rise in acetyl value proves."

Patents which describe conventional blown oils or conventional methods of making various blown oils for various purposes (including in some instances, for the purpose of demulsifying crude oils), include the following:

U. S. Patent No. 1,929,399, dated October 3, 1933, to Fuchs; U. S. Patent No. 1,969,387, dated August 7, 1934, to Tumbler; U. S. Patent No. 2,023,979, dated December 10, 1935, to Stehr; U. S. Patent No. 2,041,729, dated May 26, 1936, to Seymour; and U. S. Patent No. 1,984,633, dated December 18, 1934, to De Groote and Keiser.

Insofar that a very suitable form of a complex amine, from the standpoint of subsequent esterification, is derived from blown castor oil as a primary raw material, an effort will be made to describe this product in considerable detail. Mild oxidation of castor oil (see "Chemical Technology and Analysis of Oils, Fats and Waxes," by Lewkowitsch, 6th edition, vol. 2, p. 406) produces relatively small modifications in certain important chemical indices, such as the iodine value, the acetyl value, and the saponification value.

If drastic oxidation takes place, either by continued mild oxidation from the very beginning of the reaction, as induced by either a higher temperature of reaction, or the presence of a catalyst, such as alpha pinene, manganese ricinoleate, etc., then one obtains an oxidized oil having characteristics which clearly indicate that drastic oxidation has taken place. These indices of drastic oxidation are a relatively low iodine value, such as 65 or less, and may be as low as 40 or thereabouts; an acetyl value of approximately 160 to 200; an increased viscosity; a specific gravity of almost 1, or even a trifle over 1 at times; and in absence of other coloring matter, a deep orange color.

Drastically oxidized castor oil can be prepared by well known methods, or such products can be purchased on the open market under various trade names, such as "blown castor oil," "bodied castor oil," "blended castor oil," "blended bodied castor oil," "processed castor oil," "oxidized castor oil," "heavy castor oil," "viscous castor oil," etc. These various names appear to be applied to drastically oxidized castor oils which are different in degree but not different in kind.

Not only may blown oils be derived by direct oxidation of the various fats and oils, but also by direct oxidation of the fatty acids. Blown ricinoleic acid may be derived in the manner indicated in U. S. Patent No. 2,034,941, dated March 24, 1936, to De Groote, Keiser and Wirtel. It should be noted that blown oils in the broad generic sense herein employed include not only the products derived by oxidation, but also the products derived by polymerization. Reference is made to polymerized ricinoleic acid described in U. S. Patent No. 1,901,163, dated March 1, 1933, to Hinrichs. Reference is also made to polymerized castor oil or similar oils of the kind disclosed in application Serial No. 59,090, filed January 13, 1936, by Ivor M. Colbeth, which matured as U. S. Patent No. 2,114,651, dated April 19, 1938. It might also be desirable to point out that the expression "blown oil," as herein used, contemplates blown unsaturated liquid waxes, such as blown sperm oil. It is understood that in the appended claims the expressions "blown oil" or "blown oil fatty acids" are used in this broad sense to include all the various materials such as esterified blown fatty acids.

In such instances where blown or polymerized acids are used, it will become apparent that these materials must be converted into an ester before reaction with an amine, as subsequently described. For instance, blown castor oil fatty acids, or polymerized ricinoleic acid can be converted into the ethyl ester, methyl ester, propyl ester, cyclohexyl ester, ethylene glycol ester, glyceryl ester, or any suitable ester by means of conventional esterification processes. We desire specifically to point out that the estolides of blown oils, as described in U. S. Patent No. 2,079,762, dated May 11, 1937, to De Groote and Keiser, are not suitable to be employed in place of blown oils, even after conversion into a completely esterified material by means of a selected alcohol by conventional processes. We have found that when a blown oil is converted into an estolide, such product no longer contains the typical blown oil acidic material. Such estolides are not adaptable as raw materials for the manufacture of the complex amine employed in the final polybasic carboxy esterification.

In preparing the intermediate raw material intended for esterification in the present invention, we prefer to produce an amine by reaction with a drastically oxidized castor oil having approximately the following characteristics:

| | |
|---|---|
| Acid number | 13.2 to 25.0 |
| Saponification number | 230.5 to 274.0 |
| Iodine number | 43.5 to 55.0 |
| Acetyl number | 164.0 to 192.0 |
| Hydroxyl value | 188.0 to 220.0 |
| Percent unsaponifiable matter | 1.1 |
| Percent nitrogen | 0.0 |
| Percent SO₃ | 0.0 |
| Percent ash | Trace |

Our usual procedure is to eliminate carboxylic acidity of a blown oil by means of a conventional esterification reaction. For instance, in referring to the analysis of the blown castor oil above, it will be seen that such product contains acidity equivalent to 5-10% of the total saponifiable value. Such acidity can be removed by esterification with an alcohol such as methyl alcohol, ethyl alcohol, propyl alcohol, etc. On the other hand, insofar that glycerine is the naturally-occurring alcohol present in most oils and fats, and also insofar that glycerine is non-volatile, it is our preference to add sufficient glycerine to such blown oil and keep it agitated at a temperature of approximately 125–170° C. until carboxylic acidity disappears.

The blown oils, in their various forms, that is, in the ester form, salt form, or acid form, act similarly to fatty acids and their compounds. The typical reactions of fatty acids and amines, particularly primary or secondary amines, may be indicated by the following:

(A) Salt formation

R.COOH+R'NHH→[HHR'N.H]OOC.R (B) Amide formation

R.COOH+HR'NH→RCO.NR'H (C) The third type of reaction involves the fatty acid in the form of a salt so as to produce amino fatty acids. It is to be noted that blown oils can be reacted in such a manner and that the products so obtained are described in U. S. Patent No. 2,077,230, dated April 13, 1937, to De Groote and Keiser.

(D) It has been suggested that certain blown oils contain aldehydic acids. To the extent that aldehydic acids are present, certain amines, particularly primary or secondary amines, can enter into reactions which are characteristic of the aldehyde radical and would have no connection whatsoever with blown oils which do not contain aldehydic acids. It is to be noted that as far as we are aware, the blown oils which we have employed in the manufacture of the preferred intermediate raw material intended for polybasic carboxy esterification, are free from any aldehydic acids, and even if aldehydic acids are present, a complex amine of the kind herein contemplated would not be formed by virtue of reaction with the aldehydic group alone. As to reactions of the type involved in the ammonolysis of aldehydic acids, reference is made to U. S. Patent No. 2,079,764, dated May 11, 1937, to De Groote and Keiser.

(E) Still another type of reaction involves fatty acids and a tertiary alkylolamine, or its functional equivalent, such as a tertiary hydroxyalicyclic amine. Such reaction may be indicated in the following manner:

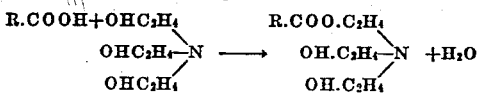

However, it is to be noted that if a blown oil is subjected to hydrolytic reaction so as to liberate the fatty acids or acid material present, the resultant materials are estolides, rather than the unaltered fatty acids. This has been pointed out in the De Groote, Keiser and Wirtel patent, to which previous reference has been made.

It is manifest that an effort to react liberated blown oil fatty acids with triethanolamine, for example, as indicated above, would not result in derivatives of the fatty acids as they occur in the blown oil, but rather at the best, it would result in derivatives of the estolides. For this reason, materials of the kind employed as the intermediate raw material intended for polybasic carboxy esterification cannot be obtained from liberated blown oil fatty acids, but must be obtained from the blown oils themselves. This is comparable to the situation indicated in our co-pending application Serial No. 180,992, filed December 21, 1937, in which it is shown that certain amines of a comparable type can be derived from triricinolein, diricinolein, monoricinolein, ethyl ricinoleate, and the like, but cannot be derived from ricinoleic acid, because polyricinoleic acid would be formed.

If various oils or fats, and especially blown oils, are reacted in ester form with hydroxy tertiary amines, one obtains materials of the kind characterized by the fact that the fatty acid radicals derived from the blown oil are present in the amine compound in an esterified form. Such form is substantially unaltered, as compared with the original form as present in the blown oil itself. It may be well to point out two facts in regard to use of the blown oils and the fatty acids derived therefrom. We have previously pointed out that ordinary blown oils show some acidity, and that our present reaction is concerned between hydroxy tertiary amines and esters, and not fatty acids. However, since many conventional blown oils contain as little as 5% free acidity, calculated in the usual manner, it is obvious that this small acidity may be ignored, and that for practical purposes the preliminary step intended to insure complete esterification may be eliminated.

Secondly, we have referred to the acids present in blown oil as "fatty acids." This is purely a matter of convenience. The expression "fatty acids" as usually employed, is intended to include unsaturated fatty acids of the kind which occur in natural oils and fats in the form of esters, such as the glycerides. These fatty acids are sometimes referred to as higher fatty acids, and occur in oils such as olive oil, cottonseed oil, soy bean oil, corn oil, castor oil, neat's-foot oil, and in marine oils such as menhaden oil, herring oil, sardine oil, pilchard oil, etc.

In some instances, these oils or the corresponding fatty acids, may be heated or oxidized so as to produce lower homologues or higher polymeric forms. For instance, ricinoleic acid can be heated in such a manner as to produce hendecenoic acid, $C_{11}H_{22}O_2$, which is a lower homologue of oleic acid. Such materials are not fatty acids in the usual sense, since they do not occur as such in natural oils and fats, but they are herein considered as fatty acids, since they represent lower homologues or isologues, and have the characteristic properties of the common fatty acids. They occur in blown oils, obtained by well-known procedure. For instance, when castor oil is heated and oxidized so as to produce blown or oxidized oil, one may at least partially break down the molecule having 18 carbon atoms into two molecules having, for example, 7 carbon atoms and 11 carbon atoms. Such acids of lower molecular weight may combine in various manners to produce acids of higher molecular weight than naturally-occurring fatty acids. Hence, the expression "fatty acids" is herein employed to refer not only to naturally-occurring fatty acids of the kind previously described, but also those kindred products of higher or lower molecular weight, which appear cogenerically in conventional blown oils in the form of free acids or esters.

As to the production of the complex amines employed as intermediate raw materials intended for polybasic carboxy esterification in the present invention, attention is directed to our co-pending application Serial No. 180,993, filed December 21, 1937. In view of the somewhat complicated chemical nature of the intermediate raw materials intended for polybasic carboxy esterification, it may be well to point out the general type of reaction involved in their manufacture. For convenience, the fatty acids of blown oils will be considered as R.COOH, and the blown oil itself will be considered as the glyceride of these materials and indicated thus: (R.COO)C₃H₅.

Purely as a matter of simplicity, triethanolamine will be selected as the tertiary hydroxy-amine for reaction with a selected blown oil. The reactions taking place in varying molecular proportions may be indicated in the following manner:

180° C., for a suitable period of time, such as 2 to 8 hours. Mild agitation is employed. A catalyst such as sodium oleate, sodium carbonate, caustic soda, etc., may be present in amounts of about one-half of one percent or less. It is to be noted that the blown oils are always in ester form and are not in acid form, thus are not subject to decomposition of the kind which occurs when one attempts to directly react a blown oil fatty acid with a tertiary alkylolamine. It is furthermore to be noted that this reaction does not take place to any appreciable extent, if the blown oil has been converted into a soap or salt. It is obvious that the blown oil fatty acids must be in the form of an ester, preferably a glyceryl ester, although some other esterified form, for instance, a derivative of a monohydric or dihydric alcohol, could be employed.

Four additional facts must be borne in mind in regard to these compounds, i. e., the complex amines which are subsequently subjected to polybasic carboxy esterification. In the first place, these amines which are employed as intermediate raw materials intended for polybasic carboxy esterification in the present invention are not quaternary ammonium bases or salts thereof. The expression "quaternary ammonium" is properly and conventionally applied to compounds in which all four hydrogen atoms of the ammonium radical NH₄ have been replaced by a hydrocarbon radical, or oxy-hydrocarbon radical, as, for example, in trimethyl phenyl ammonium hydroxide.

Secondly, an important characteristic which must be recognized is that these amine compounds are not amides. It has been previously pointed out that an amide formation involves a product in which there is a direct linkage between the

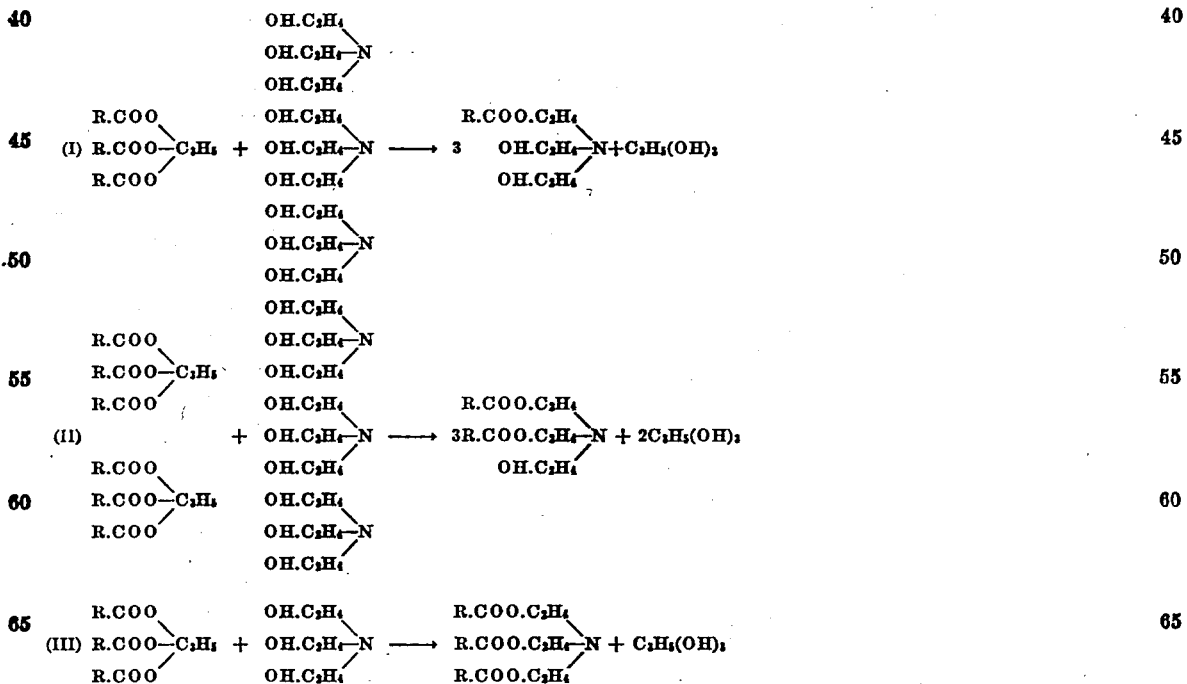

The manufacture of these compounds is relatively simple. The selected blown oil and the selected hydroxy tertiary amine are mixed in suitable proportions and heated at some point above the boiling point of water, for instance, 110° C., and at a point below the decomposition point of the amine, or the blown oil, for instance, carboxylic carbon atom and the nitrogen atom in the amine. This is not the case in the compounds employed as intermediate raw materials intended for polybasic carboxy esterification in the present invention.

In the third place, it must be recognized that these compounds are derived only from basic tertiary amines. The word "basic" is employed to exclude amines having little or no basicity, such as the ordinary aromatic amines, or any amine having at least one aryl radical directly joined to the amino nitrogen atom. For this reason, these amine products which are herein contemplated as demulsifying agents and which necessarily are characterized by freedom from any aryl groups as such, cannot be derived from aryl amines. They are derived solely from alkyl, alicyclic, or aralkyl amines having at least one hydroxyl group present. It is true that in the aralkyl amines there is an aryl group present, but it is not directly attached to the nitrogen atom, as in the case of aryl amines, but in fact, represents nothing more or less than a substituted alkylamine. For instance, we consider benzylamine as being the primary amine, phenmethyl amine.

Finally, it must be recognized that these materials have not lost any basicity in the forms of the esterified amine and that they exhibit all the properties of a basic amine, that is, they combine with water to form a base, presumably a substituted ammonium compound, but not a quaternary ammonium compound, insofar that there is always one unsubstituted hydrogen atom of the ammonium radical present. They combine with various acids to form salts. For example, they may be combined with acetic acid, hydrochloric acid, lactic acid, chloracetic acid, nitric acid, butyric acid, phosphoric acid, oxalic acid, or any suitable organic or inorganic acid, to form salts. It is understood that the reference in the specification and appended claims to the amines includes the basic form and the acid salts as well as the amines themselves. The characteristic properties of the final composition are contributed, in part, by the amine, and it is immaterial whether it be considered as being in any one of the three following forms:

$$(T)_3N$$

$$(T)_3N\diagdown\substack{H\\OH}$$

$$(T)_3NHX$$

in which T represents the substituents of the amino hydrogen radicals of the parent ammonia from which all amines are hypothetically derived, and X simply represents the acid radical of any acid employed.

In referring to the complex amines derived by reactions involving blown oils and triethanolamine, it is to be noted that the products may be characterized by the following formula:

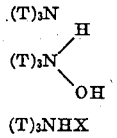

in which $m$ is 1, 2 or 3, $m'$ is 0, 1 or 2, with the proviso that $m+m'=3$, and $n$ denotes any small whole number, preferably less than 10, and in the case of triethanolamine, denotes the number 2. In the above formula and in all subsequent formulas, including such as appear in the appended claims, R.COO represents the blown oil fatty acid, which, as has been previously explained, is in reality a collection or mixture of organic acids which appear cogenerically in the manufacture of blown oils.

If, instead of employing triethanolamine, ethyl diethanolamine or a similar amine were employed, then the resulting products would be indicated by the following type formula:

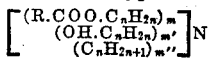

in which $m$ is 1 or 2, $m'$ is 0 or 1, $m''$ is 1, with the proviso that $m+m'+m''=3$; and $n$ has the same significance as above.

In event that diethylaminoethanol were employed, it is manifest that another variation of the above formula would appear. It is also possible to obtain compounds from such materials as acetylated triethanolamine, in which the acetyl radical has replaced one hydrogen atom of one of the hydroxy ethyl radicals. Acetic acid in this instance may be considered typical of the lower fatty acids which have less than 7 carbon atoms. If such monoacetylated triethanolamine were employed, the reaction product would be indicated by the following type formula:

in which $m$ is 1 or 2, $m'$ is 0 or 1, $m''$ is 1 or 2, and $n$ has the same significance as above. $m+m'+m''$ must be equal to 3.

In the above formula R'CO indicates an acyl radical derived from a low molecular weight fatty acid having less than 7 carbon atoms. Attention is directed to the fact that the divalent aliphatic radical indicated by $C_nH_{2n}$ may be a radical such as a $C_2H_4$ radical, $C_3H_6$ radical, $C_4H_8$ radical, $C_5H_{10}$ radical, or it may be an alicyclic radical, or an aralkyl radical, as will become obvious from the kind of amines subsequently enumerated. Furthermore, where the radical $C_nH_{2n+1}$, which is a typical alkyl radical, appears, it may be a methyl radical, ethyl radical, propyl radical, butyl radical, amyl radical, hexyl radical, octyl radical, etc. On the other hand, instead of being a monovalent alkyl radical, it may be a monovalent alicyclic radical, such as a cyclohexyl radical, or it may be an aralkyl radical, such as a benzyl radical. In the claims appended hereto, it is understood that the expression "alkylol" includes the hydroxy hydrocarbon radicals, whether derived from alkyl, alicyclic, or aralkyl radicals. It is furthermore understood in the hereto appended claims that the expression hydroxy alkyl includes hydroxy alicyclic, as well as hydroxy aralkyl radicals, provided that in the latter the hydroxyl group is attached to the aliphatic side chain. Attention is also directed to the fact that the tertiary amines involving the dihydroxy propyl radical $C_3H_5(OH)_2$ may substitute for the hydroxy alkyl radicals of the kind described. It is also understood that alkyl-oxy-alkyl radicals are the equivalent of an ordinary alkyl radical, insofar that they might appear in products such as the trihydroxy ethyl ether of triethanolamine, which may be indicated by the following formula: $N(C_2H_4OC_2H_4OH)_3$. See other examples described in U. S. Patent No. 1,923,178, dated August 22, 1933, to Ulrich et al.

Such material would be the obvious functional equivalent of triethanolamine in reactions of the kind contemplated in the manufacture of the intermediate raw material intended for polybasic carboxy esterification.

The amine employed as an intermediate raw material intended for polybasic carboxy esterification in the present invention might be indicated by the following formula:

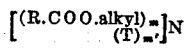

in which $m$ is 1, 2 or 3, $m'$ is 0, 1 or 2, with the proviso that $m+m'=3$; T is an alkyl radical, or a radical of the type (R'COO.alkyl) or a hydroxy alkyl radical, and R'.COO represents an acid radical having less than 7 carbon atoms. The expression "alkyl" is used in the broad sense previously specified, and it is also to be repeated that the amine may be in the form of the base, or in the form of a salt.

Suitable bases which may be reacted with blown oils or completely esterified blown oils, or esterified blown fatty acids to produce the reagents of the present invention include: triethanolamine, diethanolalkylamines, such as diethanol ethylamine, diethanol propylamine, etc.; tertiary glyceryl amines, such as monoglyceryl diethylamine, monoglyceryl dipropylamine, diglyceryl propylamine, triglycerylamine, etc. Other examples include diethanol methylamine, tripropanolamine, dipropanol methylamine, cyclohexanol diethanolamine, dicyclohexanol ethanolamine, cyclohexyl dicyclohexanol ethylamine, benzyl diethanolamine, dibenzyl ethanolamine, benzyl dipropanolamine, tripentanolamine, trihexanolamine, ethyl hexyl ethanolamine, octadecyl diethanolamine, polyethanolamine, etc.

In indicating the various hydroxylated tertiary amines of the non-aryl type, which may be employed to produce the amine contemplated as the intermediate raw material intended for polybasic carboxy esterification in the present invention, it is desirable to indicate that amines of the type where a hydroxy acyl radical replaces a hydrogen atom of the hydroxyl radical of the hydroxy tertiary amine, are not included within the broad class of hydroxy tertiary amines, unless there is another hydroxyl radical attached to the usual alkyl radical. For instance, if diethyl amino ethanol is treated with lactic acid so as to form lactyl ethanol diethylamine of the following formula:

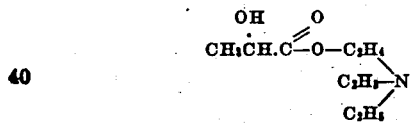

then it is understood that such materials would not represent a hydroxy tertiary amine within the meaning or scope, as herein employed. If, on the other hand, triethanolamine were treated with lactic acid so as to give monolactyl triethanolamine of the following composition:

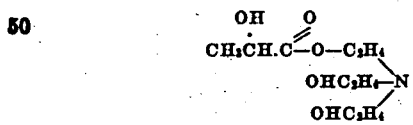

then such compound would be included, due to the presence of one or more hydroxyl radicals attached to the alkyl radicals.

The following examples indicate various methods by which one can prepare complex amines of the kind which are suitable for polybasic carboxy esterification:

*Complex amine—Example I*

Blown castor oil of the kind previously described in detail is employed. For the sake of convenience, its molecular weight is considered as being 1000. Commercial triethanolamine and blown castor oil in the proportion of one mole of blown castor oil to three moles of triethanolamine are heated to a temperature between 150° and 180° C. for about 2 hours. Mild agitation is employed.

*Complex amine—Example II*

Triglycerylamine (tri-dihydroxy propylamine) is substituted for triethanolamine in Example I.

*Complex amine—Example III*

Diamyl monoglycerolamine (1-di-amyl amine propane 2,3,diol) is substituted for triethanolamine in Example I.

*Complex amine—Example IV*

Dicyclohexylamine is reacted with glycerol monochlorhydrin to give monoglyceryl dicyclohexylamine. This product is substituted for triethanolamine in Example I.

*Complex amine—Example V*

Dibenzylamine is reacted with glycerol monochlorhydrin to produce monoglyceryl dibenzylamine. This product is substituted for triethanolamine in Example I.

*Complex amine—Example VI*

Polyethanolamine:

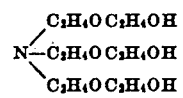

is substituted for triethanolamine in Example I.

*Complex amine—Example VII*

Blown rapeseed oil of commerce, molecular weight figured as 990, is substituted for blown castor oil employed in Examples I–VI, inclusive.

*Complex amine—Example VIII*

Blown cottonseed oil, molecular weight figured as 980, is substituted for blown castor oil in Examples I–VI, inclusive.

It is obvious that the amines of the kind above described will contain hydroxyl groups attached to the fatty acid radical derived from blown oil, insofar that all blown oils show a hydroxyl or acetyl value, and, as previously has been pointed out, such radicals appear without change in the complex amine. It has furthermore been indicated that the complex amine may also have a hydroxyl radical as part of an alkylol radical. In addition to this, there may be found hydroxyl radicals present, due to condensation with glycerol by means of an ether linkage. In any event, the complex amines of the kind above described are reacted with polybasic carboxy acids so as to produce an esterification product, and preferably, an esterification product of the kind in which there is at least one residual carboxyl radical.

Esterification is conducted in the conventional manner. The two materials are heated together at a temperature above the boiling point of water, for instance, 110–160° C., and agitated until esterification has proceeded to the desired point. One may pass through a dried inert gas to hasten esterification, or esterification may take place in an inert solvent, in which both components are mutually soluble, as, for example, xylol. Under such conditions the reaction is best conducted at the boiling point of the inert solvent, for instance, xylene, and after the reaction is complete, the xylene is eliminated.

It is to be understood that although phthalic anhydride is the most desirable aromatic reagent, one may employ polybasic carboxy acids or their anhydrides, such as succinic acid, malic acid, fumaric acid, citric acid, maleic acid, adipic acid, tartaric acid, glutaric acid, diphenic acid, naphthalic acid, oxalic acid, suberic acid, pimelic acid, etc. In subsequent examples, phthalic anhydride will be employed, because in many instances it is most desirable to use the anhydride of an aromatic acid, and also because phthalic anhydride is obtainable at a relatively low cost in a state of high technical purity. Furthermore, phthalic anhydride shows little or no tendency to produce objectionable secondary reactions, and as a rule, one obtains almost theoretical yields of the desired products. It is understood, however, that any polybasic carboxy acid may be employed, or any functional derivative thereof. It is also obvious that after reaction any free ionizable hydrogen atom can be neutralized in any suitable manner, for instance, by reaction with caustic soda, caustic potash, ammonia, any basic amine or the like, or by further esterification with a mono-hydric alcohol, for example, such as methyl alcohol or ethyl alcohol, or with a dihydric alcohol, such as ethylene glycol, or a trihydric alcohol, such as glycerol. In view of this fact, the acid esters of carboxy acids, such as butyl hydrogen phthalate, propyl hydrogen phthalate, ethyl hydrogen oxalate, etc., would be the functional equivalent of the polybasic carboxy acid itself.

*Composition of matter—Example I*

The complex amine derived according to the directions under the heading "Complex amine—Example I" is analyzed so as to determine its hydroxyl value and also its average molecular weight. From these values a calculation is made so as to determine the proper amount of phthalic anhydride to add, based on the reaction permitting a residual carboxyl radical to remain. The materials are intimately mixed and heated at approximately 120–160° C., with constant agitation, until samples taken from the batch and analyzed show substantially complete disappearance of the hydroxyl value.

*Composition of matter—Example II*

Instead of employing the complex amine of the kind previously described under the heading "Complex amine—Example I," substitution of other complex amines of the kind indicated under "Complex amines—Examples II–VIII," inclusive, are employed.

*Composition of matter—Example III*

Examples of the kind prepared according to "Composition of matter—Examples I and II," are modified by the employment of maleic acid instead of phthalic acid.

*Composition of matter—Example IV*

In the example immediately preceding, oxalic acid is substituted for maleic acid with modification so that the reaction is conducted at a lower temperature to prevent decomposition of the oxalic acid—for instance, 110–120° C.

*Composition of matter—Example V*

Products of the kind described in the example immediately preceding are prepared, but adipic acid is substituted for oxalic acid.

We desire to emphasize that the products obtained in the above examples may be used in the form of the amine by direct contact with an emulsion without contact with water. They may be contacted with water, i. e., in the form of a solution, so as to produce, in a greater or lesser degree, the amine base. Furthermore, any of the products above described may be combined with a suitable acid. Acetic acid may be employed. Hydrochloric acid is particularly desirable. In some instances acids, such as oleic acid or naphthenic acid, may be employed to give a suitable salt. As previously pointed out, any carboxylic hydrogen atom may be replaced by a suitable metallic atom or an organic radical derived from an alcohol or from an amine. All such ionizable hydrogen atom equivalents are considered as the functional equivalent of the ionizable hydrogen atoms themselves, and such neutralized forms are included in the scope of the appended claims as the equivalent of the acidic form. It is realized that where a free carboxyl and a basic amine residue exist in the same molecule, there may be a tendency towards the formation of inner salts comparable to sulfanilic acid; but due to the size of the molecule involved and perhaps for reasons of steric hindrance, we are not aware that such inner salts are formed.

In examining the method of manufacture of these complex amines, as previously illustrated, it is apparent that certain by-products appear as glycerine, mono- or diglycerides, etc. From a practical standpoint it is unnecessary to separate these cogeneric materials, although it would be possible to do so by conventional processes. It is quite possible that these materials which appear as part of the reaction mass contribute to a greater or lesser degree to the demulsifying power of the final material as obtained after polybasic carboxy esterification. It may be that some of these materials which appear in the reaction mass cannot be completely identified as to their form. For instance, it is at once possible to see that condensation products might be formed under proper conditions between complex amines of the kind employed and either glycerol or triethanolamine, by virtue of an ether linkage. Both glycerol and triethanolamine may be present in the manufacture of some of the complex amines which are subsequently subjected to polybasic carboxy esterification. In view of this fact, in the appended claims the composition of matter or product herein contemplated will be described not only in terms of conventional chemical structure, but also in terms of the method of manufacture. The purpose of the claims which are characterized by reference to the method of manufacture is to include specifically the general reaction mass produced in the manufacture of the amine bodies.

One should not lose sight of the fact, however, that the present invention is concerned particularly with the employment of certain chemical compounds of definitely stated composition, which are present in significant or predominant amounts in the mixtures obtained by the reactions described. Needless to say, the composition of matter is not limited to any particular method of manufacture, except in the appended claims, in which specific reference is made to manufacturing procedure.

Briefly, then, the composition of matter herein contemplated depends on a reaction involving a polybasic carboxy acid or its functional equivalent, as described, and the complex amine of the kind described, in such a manner as to involve reactions other than salt formation. In other words, the complex amines are basic in nature, and therefore, could react with a polybasic carboxy acid so as to form a salt in the manner indicated thus:

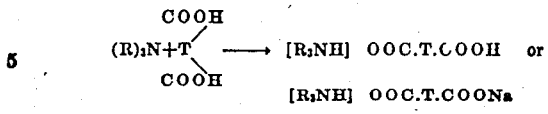

Such reactions are purely salt formation. The materials of the kind herein contemplated, regardless of their nature, are of the kind other than salt formation.

We desire to emphasize that the expression "polybasic carboxy acid," as it appears in the claims refers not only to the acid itself, but to any functional equivalent, such as the anhydride, the acyl chloride, the acid salt, such as sodium hydrogen phthalate, amylamine hydrogen phthalate, ammonium hydrogen phthalate, benzylamine hydrogen phthalate, cyclohexylamine hydrogen phthalate, ethanolamine hydrogen phthalate, diethanolamine hydrogen phthalate, triethanolamine hydrogen phthalate, or the acid esters such as ethyl hydrogen phthalate, propyl hydrogen phthalate, butyl hydrogen phthalate, ethylene glycol hydrogen phthalate, dihydroxy propyl hydrogen phthalate, etc.

Attention is directed to the fact that the word "Amidification" has been applied to the reaction involving the replacement of an amino hydrogen atom by an acyl radical, without conventional limitation to a reaction involving ammonia. The replacement of the amino hydrogen atom of a primary amine or a secondary amine by an acyl radical has been considered as being amidification, rather than the formation of a substituted amide or the formation of an imide or substituted imide. Such obvious departure from conventional nomenclature has been for purposes of simplicity and to show the similarity between certain reactions.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described may be admixed with one or more of the solvents customarily used in connection with conventional demulsifying agents. Moreover, said material or materials may be used alone or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the new demulsifying material or composition herein described.

We desire to point out that the superiority of the reagent or demulsifying agent constituting our present invention is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In using the herein described new demulsifying agent to resolve the petroleum emulsion, the said demulsifying agent is brought into contact with or caused to act in any of the various ways, or by any of the various apparatus now generally used to resolve or break petroleum emulsions with a chemical reagent, the above procedure being used either alone, or in combination with other demulsifying procedure, such as the electrical dehydration process.

Having thus described our invention, what we claim as new and desire to secure by Letters Patent is:

1. A composition of matter, comprising the products derived by esterification reaction between (a) a polybasic carboxy acid, and (b) the hydroxylated product derived by an alcoholysis reaction, under substantially anhydrous conditions, between a blown oil and a tertiary hydroxy amine having at least one hydroxyl group aliphatically bound to the amino nitrogen atom and free from amino nitrogen linked aryl radicals, within the molal ratio of 1:1 and 1:3 at a temperature above the boiling point of water and below the point of decomposition; said last mentioned reaction being conducted in a manner to yield a substantial quantity of basic material in which the blown oil fatty acid radical is attached to the basic nitrogen atom through a carbon atom chain by replacement of the hydrogen of at least one hydroxyl of the hydroxy amine by the acyl group of the blown oil fatty acid radical; said first mentioned esterification reaction involving a polybasic carboxy acid and being conducted in a manner so as to react with at least one hydroxyl radical of the blown oil fatty acid radical which is a part of the same molecule containing the basic nitrogen atom.

2. A composition of matter, comprising the products derived by esterification reaction between (a) a polybasic carboxy acid, and (b) the hydroxylated product derived by an alcoholysis reaction, under substantially anhydrous conditions, between a blown oil and triethanolamine within the molal ratio of 1:1 and 1:3, at a temperature above the boiling point of water and below the point of decomposition; said last mentioned reaction being conducted in a manner to yield a substantial quantity of basic material in which the blown oil fatty acid radical is attached to the basic nitrogen atom through a carbon atom chain by replacement of the hydrogen of at least one hydroxyl of the hydroxy amine by the acyl group of the blown oil fatty acid radical; said first mentioned esterification reaction involving a polybasic carboxy acid and being conducted in a manner so as to react with at least one hydroxyl radical of the blown oil fatty acid radical which is a part of the same molecule containing the basic nitrogen atom.

3. A composition of matter, comprising the products derived by esterification reaction between (a) a polybasic carboxy acid, and (b) the hydroxylated product derived by an alcoholysis reaction, under substantially anhydrous conditions, between a blown castor oil and triethanolamine within the molal ratio of 1:1 and 1:3, at a temperature above the boiling point of water and below the point of decomposition; said last mentioned reaction being conducted in a manner to yield a substantial quantity of basic material in which the blown oil fatty acid radical is attached to the basic nitrogen atom through a carbon atom chain by replacement of the hydrogen of at least one hydroxyl of the hydroxy amine of the acyl group of the blown oil fatty acid radical; said first mentioned esterification reaction involving a polybasic carboxy acid and being conducted in a manner so as to react with at least one hydroxyl radical of the blown oil fatty acid radical which is a part of the same molecule containing the basic nitrogen atom.

4. A composition of matter, comprising the product derived by esterification reactions between (a) a polybasic carboxy acid, and (b) a chemical compound of the type indicated by the formula:

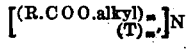

in which $m$ is 1, 2, or 3, $m'$ is 0, 1, or 2, with the proviso that $m+m'=3$, T is selected from the class consisting of alkyl radicals, radicals of the type (R'.COO.alkyl) and hydroxy alkyl radicals, R.COO represents the blown oil fatty acid radical, and R'.COO is an acid radical having less than 7 carbon atoms; said product being further characterized by the fact that the esterification reaction with the aforementioned polybasic carboxy acid involves at least one hydroxyl radical of a blown oil fatty acid radical indicated by the symbol R.

5. A composition of matter, comprising the product derived by esterification reactions between (a) a polybasic carboxy acid, and (b) a chemical compound of the type indicated by the formula:

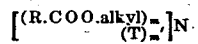

in which $m$ is 1 or 2, and $m'$ is 1 or 2, with the proviso that $m+m'=3$, T is a hydroxy alkyl radical, and R.COO is a blown oil fatty acid radical; said product being further characterized by the fact that the esterification reaction with the aforementioned polybasic carboxy acid involves at least one hydroxyl radical of a blown oil fatty acid radical indicated by the symbol R.

6. A composition of matter, comprising the product derived by esterification reactions between (a) a polybasic carboxy acid, and (b) a chemical compound of the type indicated by the formula:

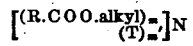

in which $m$ is 1 or 2, and $m'$ is 1 or 2, with the proviso that $m+m'=3$, T is a hydroxy ethyl radical, and R.COO is a blown oil fatty acid radical; said product being further characterized by the fact that the esterification reaction with the aforementioned polybasic carboxy acid involves at least one hydroxyl radical of a blown oil fatty acid radical indicated by the symbol R.

7. A composition of matter, comprising the product derived by esterification reactions between (a) a polybasic carboxy acid, and (b) a chemical compound of the type indicated by the formula:

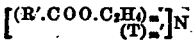

in which $m$ is 1 or 2, and $m'$ is 1 or 2, with the proviso that $m+m'=3$, T is a hydroxy ethyl radical, and R'.COO is a blown oil fatty acid radical derived from castor oil; said product being further characterized by the fact that the esterification reaction with the aforementioned polybasic carboxy acid involves at least one hydroxyl radical of the blown castor oil fatty acid radical indicated by the symbol R'.

MELVIN DE GROOTE.
BERNHARD KEISER.
CHARLES M. BLAIR, Jr.